United States Patent Office 3,556,984
Patented Jan. 19, 1971

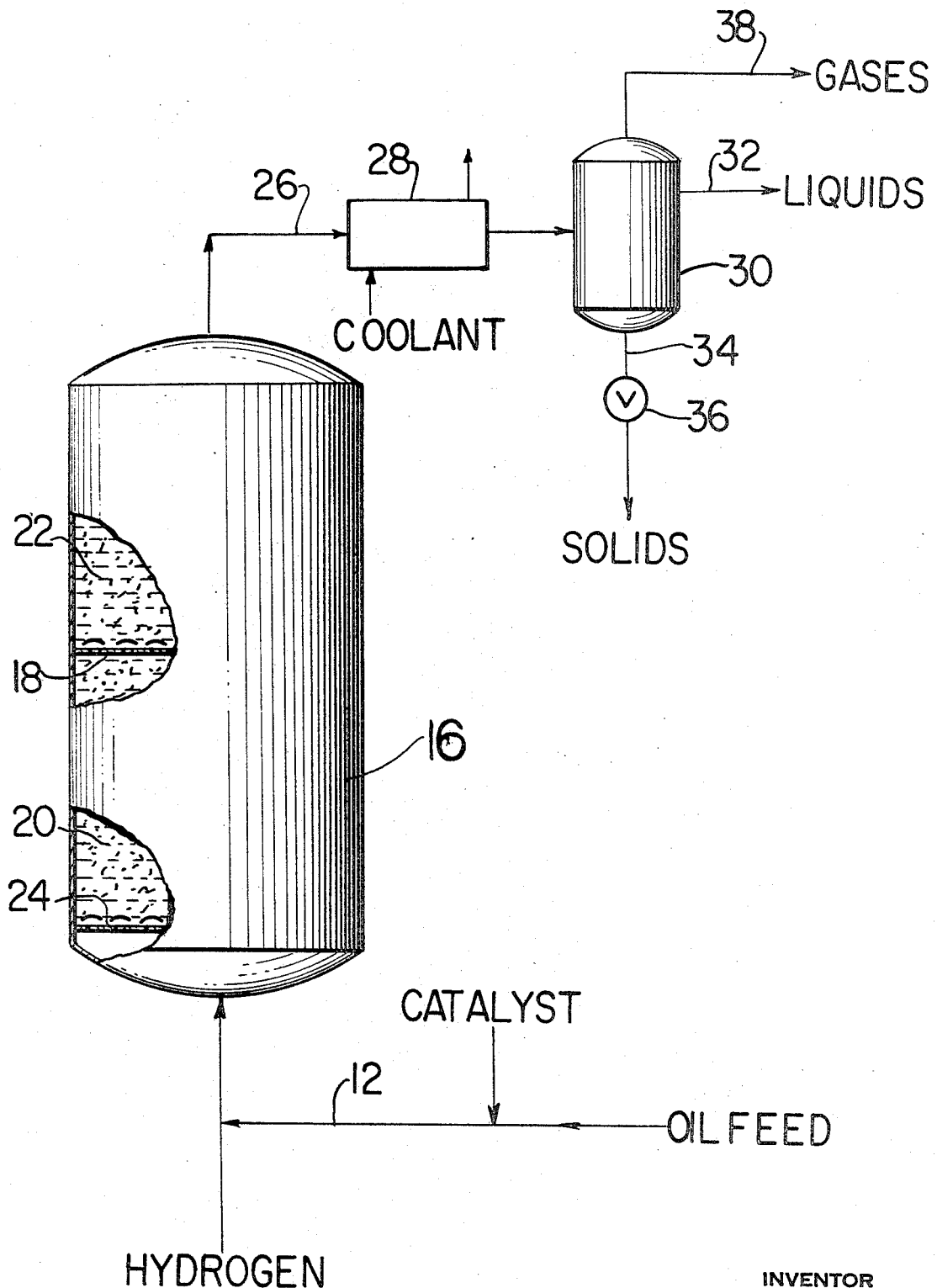

3,556,984
HYDROTREATING PROCESS
Roger P. Van Driesen, Hopewell, N.J., assignor to Cities Service Research and Development Company, New York, N.Y., a corporation of Delaware
Filed May 28, 1968, Ser. No. 732,746
Int. Cl. C10g 13/00
U.S. Cl. 208—59                                              5 Claims

ABSTRACT OF THE DISCLOSURE

An improved method for hydrotreating heavy hydrocarbon oils is disclosed herein which provides for hydrocracking, hydrogenation, hydro-desulfurization, and nitrogen removal utilizing a single reaction vessel having upper and lower reaction zones divided by a transverse one way grid. The method comprises passing a heavy hydrocarbon oil, with hydrogen gas, and fine particulate catalyst upwardly through the lower reaction zone at a rate to establish a continuous flow stirred reactor, contacting the hydrocarbon oil with hydrogen in the presence of the fine particulate catalyst in the lower reaction zone at a temperature of up to 780° F. and at a high pressure and passing the contacted hydrocarbon oil, hydrogen gas and catalyst slurry upward through the one way grid into the upper reaction zone, while simultaneously preventing any return (backmixing) flow of hydrocarbon oil, hydrogen gas, and catalyst slurry back into the lower reaction zone. Temperature control of the process is obtained by controlling the temperature of the various feed materials. The upper reaction zone is maintained at a higher temperature from about 800° F. to about 850° F. by the continuing exothermic reaction. A lower boiling hydrocracked, denitrogenized, and desulfurized hydrocarbon product together with spent catalyst slurry and various gases are withdrawn as effluent from the reaction vessel.

BACKGROUND OF THE INVENTION

This invention relates to the treatment of hydrocarbon oil and more particularly the treatment of heavy or high boiling liquid hydrocarbon oil with hydrogen in the presence of a fine particulate catalyst slurry. The invention has particular application to the hydrogenation, hydrocracking, hydro-desulfurization and nitrogen removal of relatively heavy hydrocarbon oils in order to produce hydrocarbon products in lower boiling ranges, having reduced nitrogen and sulfur content.

Heavy hydrocarbon materials such as residuum, naturally occurring tars and shale oil, coker gas oil and other high boiling hydrocarbon ends generally require further treatment in order to obtain commercially usable lighter hydrocarbon distillates. Such heavy hydrocarbon oils are generally unsatisfactory for further conventional refinery treatment since they exhibit a large degree of unsaturation or rather have a high olefin content, and also have high nitrogen and sulfur content which must be reduced in order to economically treat them in a conventional process. Hydrocracking processes for conversion of the heavy hydrocarbon oils to light and intermediate naphthas of good quality for reforming feed stocks, fuel oil and gasoline, and for nitrogen removal and hydrosulfurization are generally well known. Such processes have commonly been carried out using a fixed bed of catalyst with hydrocarbon oil and hydrogen passing in a down-flow stream through the catalyst bed. Hydogen consumption has been found to be very high in such processes and a considerable amount of heat is released due to the exothermic nature of the reaction. This normally results in a considerable temperature rise across the catalyst bed and increased carbon deposition on the catalyst.

In order to limit the amount of heat released during the reaction, the degree of cracking per pass is limited to some extent and the material recycled for further processing. Such recycling is expensive and cumbersome and results in low space velocities based on fresh feed, partly because of the excessive high reactive volume occupied by the recycle liquid and the already converted material. It has therefore been suggested that certain types of hydrogenation processes be carried out in the presence of finely divided catalyst which pass upwardly through the hydrogenation zone as a slurry together with the hydrocarbon oil feed and the hydrogen gas. Such finely divided catalyst particles also have a higher catalytic activity than a similar though larger particulate catalyst.

A suitable procedure for utilizing such an upflow slurry of catalyst and liquid in hydrocracking processes is shown for instance in U.S. Pat. No. 3,207,688 issued to Roger P. Van Driesen, the inventor herein, on Sept. 21, 1965 for a two-stage hydrocracking process. It has also been suggested that ebullated bed type reactors be used in certain types of hydrogenation processes. An ebullated bed hydrogenation system, while eminently suitable for certain types of hydrogenation processes generally requires recycling of a portion of a liquid reactant in order to maintain the catalyst bed in a state of expanded random motion. The large type particulate catalyst used in ebullated bed systems also do not readily lend themselves to transfer from one stage of the reactor to another and additionally require complicated piping such as separate catalyst withdrawal conduits and catalyst supply conduits.

Finally, the operation of hydrogenation or hydrocracking processes such as those described briefly above are further complicated by the possible premature poisoning and inactivation of catalyst by nitrogen content in the feed. The introduction of finely divided fresh catalyst particles which are carried along with the liquid hydrocarbon oil and exist with the hydrogenated, hydrocracked product stream as spent catalyst slurry is of course a solution to the problem of maintaining the activity of catalyst bed in the presence of the various poisoning agents. However, a single stage reactor having such an upflow of finely divided catalyst along with the liquid hydrocarbon and hydrogen gas does not provide sufficient removal of both nitrogen and sulfur. A solution of course would be to have a very long reactive vessel with longitudinal or plug flow where the longer retention time would provide for more complete hydrotreating of the hydrocarbon oil but such a long reactive vessel is very impractical from both engineering and commercial considerations.

In theory a non-flow batch reactor (having complete mixing) provides similar conversion rates on a time basis to a longitudinal-flow or plug-flow type reactor (having no longitudinal mixing i.e. backmixing, but rather having complete radial mixing). This comparative conversion rate however do not hold for reactors such as continuous flow stirred-tank reactors, where there is considerable backmixing in the reactor. Where backmixing occurs to a significant extent, the conversion rates are found to be generally lower than those in a longitudinal flow or plug-flow reactor. Backmixing is therefore generally undesirable since lower conversion rates are obtained. Where stirred type reactors are required, higher conversion rates are obtained by treating the feed in a series of such stirred reactors. Such a solution is disclosed by the above mentioned U.S. Pat. No. 3,207,688 where two separate reactive vessels are used in series. However, the provision of two separate reactive vessels with associated piping and various other auxiliary apparatus is costly from an equipment and from an operative viewpoint. For instance it has been found that transferring catalyst from a first to a second reactor results in breakup (attrition) of the catalyst in the trannsfer line due to the high flow velocities encountered. It would be desirable to provide a simple and yet efficient apparatus for hydrotreating heavy hydrocarbon oils with hydrogen in the presence of the finely divided catalyst.

SUMMARY OF THE INVENTION

Accordingly, I have invented a process utilizing a reaction vessel having a one way transversely mounted grid which divides the vessel into a lower and an upper reaction zone. Additionally, the reactive vessel has a feed conduit passing into the lower reaction zone below a lower transversely mounted grid and an effluent conduit extending from the top of the reactor vessel for removing hydrotreated hydrocarbon oil, gaseous effluent, and spent fine catalyst particles. Briefly the method comprises feeding hydrocarbon oil, hydrogen gas and fresh finely divided particulate catalyst into the lower reaction zone at a rate sufficient to promote backmixing and contacting the hydrocarbon oil with the hydrogen gas in the presence of the catalyst particle slurry, passing the contacted hydrocarbon oil, hydrogen gas and catalyst particle slurry up into the upper reaction zone at a rate sufficient to promote backmixing in the upper reaction zone, and simultaneously preventing any hydrocarbon oil, and catalyst particles from passing back into the lower reaction zone, and removing the treated hydrocarbon oil in an effluent stream.

Accordingly, it is an object of this invention to provide a method for efficiently treating hydrocarbon oils with hydrogen in the presence of a particulate catalyst.

It is another object of this invention to provide a method for the two stage hydrotreating of hydrocarbon oils in a single reactive vessel.

Another object of this invention is to provide a method for the efficient removal of nitrogen constituents and the desulfurization of heavy hydrocarbon oils.

Other objects and advantages in the method of this invention will be apparent to those skilled in the art from the drawing and description of the preferred embodiment which follow.

DESCRIPTION OF THE DRAWING

The drawing is of a single reactor vessel in cut-away view and operating in accordance to the method of this invention.

DESCRIPTION OF THE PREFERRED EMBODIMENT

Referring now to the drawing wherein a preferred embodiment of the process according to this invention is shown, a heavy hydrocarbon oil is passed into feed conduit 12 from a source not shown. The heavy hydrocarbon oil, preferably one boiling in the range between about 350° F. and 1100° F., may include for instance, virgin or thermal naphthas, catalytic cracking naphthas, cycle oils, virgin or thermal gas oils, coker distillate, vacuum gas oils, deasphalted gas oils, and any other fraction boiling in these general ranges and derived from crude petroleum, naturally occurring tars and shale oils or from various synthetic crude oils. Relatively heavy hydrocarbon oils having at least about 40% by volume boiling above about 650° F. are especially suitable for treatment in accordance with the present invention. Such heavy oil feed frequently contains sulfur and nitrogen compounds and the preferred embodiment of this invention is particularly suitable for treatment of these heavy hydrocarbon feeds according to the process of this invention.

A finely divided particulate hydrogenation catalyst is also passed into the feed conduit 12 from a source not shown. Such a catalyst is in the form of small particles generally no larger in size than 300 microns and therefore suitable for slurrying in the various hydrocarbon liquids i.e. feed reactant and effluent. Preferably the catalyst particle should be between about 50 to 100 microns in size and should be included in the feed in a quantity of from 0.01 lb. of catalyst per barrel of feed to 0.2 lb. catalyst per barrel and preferably in amounts no greater than 0.2 lb. of catalyst per barrel of feed. Such catalysts are generally well known in the art and include for example, cobalt, iron, molybdenum, nickel, tungsten, platinum, palladium, their sulfides and oxides as well as combination of the same and naturally occurring clays etc. and may be supported if necessary on a suitable base such as alumina, silica, or silica-alumina. A particularly suitable catalyst is composed of nickel cobalt oxides or nickel molybdenum oxides in minor proportions on a silica-alumina base.

As shown in the drawing a hydrogen containing gas is supplied from a source not shown to the feed conduit 12 upstream of the point where the catalyst particles were added. The hydrogen containing gas may be process recovered hydrogen or a hydrogen containing hydrocarbon gas such as methane and is supplied to the feed conduit 12 in amounts between about 1,000 and about 50,000 standard cubic feet of hydrogen per barrel of hydrocarbon feed with rates greater than 6,000 standard cubic feet of hydrogen per barrel of feed being preferred.

The feed conduit 12 is communicatingly connected to a reactor vessel 16 at the bottom thereof. The reactor vessel 16 is divided into two reaction zones by a transverse one way grid 18 fixedly mounted to the interior wall of the reactor vessel. The grid 18 forms the boundary between a lower reaction zone 20 and an upper zone 22. A second transverse one way grid 24 is fixedly mounted in the bottom of the reactor vessel 16 and forms the lower boundary of the lower reaction zone 20. The second grid acts as a distribution means suitable for uniformly passing the feed materials substantially across the total cross-sectional area of the lower reaction zone 20. Both upper and lower transverse grids may be of conventional construction, a specific example of which are bubble cap trays such as are illustrated in the drawing.

The mixture of the heavy hydrocarbon oil feed, hydrogen containing gas and finely divided particulate catalyst passes from the feed conduit into the bottom of the lower reaction zone 20. It should of course be appreciated that the various individual reactants and catalyst particles can be separately passed into the bottom of the reactor zone 20, but that as a matter of cost and convenience it is desirable to slurry the catalyst particles in one of the fluid feed streams.

In the lower reaction zone 20, the hydrocarbon oil feed is subjected principally to a hydrogenation reaction. While temperatures in the lower reaction zone 20 may be in the range of from about 650° F. to about 900° F., it is preferable that the temperature be maintained between about 700° F. and 800° F. and particularly preferable that the maximum temperature be up to about 780° F. Likewise partial pressure of the hydrogen in the lower reaction zone is maintained at a suitable level such as between about 500 and about 4,000 p.s.i.g., with a pressure between about 1,000 and about 1,500 p.s.i.g. being preferred.

While it is generally thought desirable to maintain the temperature as uniform as possible throughout the lower reaction zone 20, the highly exothermic nature of the hydrogenation reactions tends to cause the temperature at the top portion of the reaction zone to be considerably higher than that near the inlet. The nonuniformity of the temperature distribution in the lower reaction zone 20 is however reduced and taken advantage of to a substantial degree by the process of this invention. The height vs. the cross-sectional area of the lower reaction zone is such that backmixing within the reaction zone is promoted so as to have that sort of reactant distribution which is characteristic of a completely stirred reactor rather than the streamline flow obtained in a plug flow reactor. Thus longitudinal mixing or backmixing is maintained rather than purely plug flow or radial mixing. More descriptively backmixing or longitudinal mixing is that mixing which is caused by reverse flow patterns within the generally upward flow of the materials.

Such mixing is obtained by the cross-sectional flow area of the reactor, the height of the reactor, and the flow rates maintained in the reactor. The ratio of the height of the lower reaction zone to the cross-sectional diameter is on the order of between 1/2:1 and 20:1 and preferably between about 3:1 and 10:1 with overall space velocities in the lower reaction zone between about 0.1 and about 5 volumes of feed per hour per volume (v./hr./v.) of reaction zone capacity, a space velocity of between about 1.0 v./hr./v. and about 2.0 v./hr./v. being particularly preferred. Thus by promoting back-mixing in the lower reaction zone a high degree of temperature uniformity is obtained throughout the reaction zone. The lower reaction zone temperature is maintained by controlling the inlet temperature of either or both the hydrocarbon oil feed or the hydrogen containing gas. The heat of reaction is consumed in raising the feed from the inlet temperature to reactor temperature. The high degree of backmixing therefore permits utilization of feed temperature control to maintain the desired temperature limits throughout the lower reaction zone and thus affords the advantage of eliminating internal quenching or internal heat exchangers in the reaction zone.

The hydrogenation treatment in the lower reaction zone serves to principally remove the sulfur components, hydrogenate and partially crack the feed oil. Thus for example the sulfur content of the hydrocarbon material may be reduced from about 1.0% by weight to less than about 0.1% weight and the nitrogen content may for example be reduced from about 500 parts per million (p.p.m.) to about 30 p.p.m. A portion of the reacted material in the upper part of the lower reaction zone 20 is continually allowed to pass through the upper transverse grid 18 into the upper reaction zone 22. The exothermic hydrogenation of this material continues but to a lesser degree in the upper reaction zone since a portion of the free hydrogen originally introduced into the reaction vessel has been depleted, a portion of the hydrocarbon feed has been hydrogenated and converted to lower boiling components which are not readily hydrogenated, and the particulate catalyst having been subjected to use is somewhat deactivated.

Additionally the upper one way grid 18 acts as a one way valve and prevents any material from passing back into the lower reaction zone 20 and backmixing with the material there, without subjecting any of the upward passing material from the lower to the upper reaction zone to any severe or high velocities in passing. An important advantage of such a procedure is to reduce or eliminate severe attrition or breaking up in the particulate catalyst and thereby retain satisfactory activity for the catalyst.

Backmixing is encouraged in the upper reaction zone by maintaining the specific space velocities already described in reference to the lower reaction zone and by having an upper reaction zone height to cross-sectional diameter ratio between about 1/2:1 and 20:1 and preferably between about 3:1 and 10:1. This allows the temperature in the upper reaction zone 22 to be uniformly maintained at only a slightly higher temperature than that maintained in the lower reaction zone 20. Temperature in the upper reaction zone is preferably maintained in the range of from about 800° F. to about 900° F. with a temperature of between 805° F. and 825° F. being particularly useful when the temperature of the lower reaction zone is about 780° F. maximum. By maintaining a limit as the maximum temperature at which the hydrocarbon oil is treated, the amount of hydrocarbon material converted is effectively increased since coking and other losses of hydrocarbon material are minimized.

The use of a second upper reaction zone 22 in which backmixing is promoted within the zone also affords the advantage of increased efficiency of the reactor in conversion of the hydrocarbon feed. Thus for a hydrogenation reaction which affords a 90% conversion, the conversion rate for the process of this invention is theoretically in the order of about 99% and actually about 95.6%.

The higher temperatures obtainable in the upper reaction zone afford a better removal of a portion of the remaining nitrogen. Temperature is maintained in the upper reaction zone between about 800° F. and about 900° F. with a temperature between about 805° F. and about 825° F. being particularly preferred. Space velocity and pressures are maintained at about the same as that obtained in the lower reaction zone with backmixing within the upper reaction zone being somewhat similar to that found in the lower reaction zone to approximate a stirred reactor or substantially backmixed reaction.

Effluent is drawn out of the vessel 16 through an effluent conduit 26 mounted in the top of the reactor vessel. The effluent consists of gaseous and liquid hydrocarbons, spent finely divided particulate catalyst, nitrogen containing gases such as ammonia, sulfur containing gases such as hydrocarbon sulfide and various other gases such as hydrogen and hydrogen containing gases. The effluent is passed through a conventional cooler 28 to a solid-liquid gas separator 30 where the various phases are separated, and the hydrocarbon liquid is passed out through a liquid withdrawal conduit 32 and used as feed for a conventional petroleum refining operation. Solids are removed through a solid withdrawal conduit 34 and dump valve 36 and are either discarded, or passed to a catalyst regenerator, not shown, for regeneration and reuse. Gases are also separated and removed through a gas withdrawal pipe 38. The gases which include ammonia, hydrogen, and hydrogen sulfides are subsequently removed by a scrubber, not shown, and any hydrogen containing gas may be recycled to the reactor vessel 16.

EXAMPLE

With reference to the process of the present invention, the following example is given by way of illustration rather than limitation. A distillate hydrocarbon feed oil having the properties shown below is introduced through feed conduit 12 into the reactor vessel 16 together with 10,000 standard cubic feet of hydrogen per barrel, and about 0.01 lb. of catalyst per barrel of feed.

FEED PROPERTIES

Gravity—20.5° API
Sulfur—1.85% weight
Nitrogen—900 p.p.m.
Boiling range—650° F.–1000° F.

The lower reaction zone 20 is maintained at a hydrogen partial pressure of 1,500 p.s.i.g., a temperature of 790° F. and the reactant fluid has a space velocity of 0.4 volume of fresh feed per volume of reaction zone. The catalyst is in the form of microspheroids of 50–100 micron size, and is composed of nickel-tungsten catalyst on a silica-alumina base. After treatment in the lower reaction zone 20, a continuous portion of the reactant materials and the catalyst passes into the upper reaction zone which is maintained at the same pressure, and space velocity as the lower reaction zone but at a temperature of about 815° F. Oil removed from the upper reaction zone exhibits the following properties.

Gravity—34.0° API
Sulfur—0.01% weight
Nitrogen—1 p.p.m.
Conversion (below 650° F.)—91% by volume In contrast, when treating the same feed in a conventional single reaction zone vessel under similar conditions to those maintained in the lower reaction zone 20 of the reactor vessel 16 of the present invention, treated oil was found to have the following properties:

Gravity—33.0° API
Sulfur—.02% weight
Nitrogen—15 p.p.m.
Conversion (below 650° F.)—83% by volume Having described the invention with reference to the preferred embodiment thereof, and intending to cover those changes and modifications which may be made without departing from the spirit and scope of the invention.

I claim:

1. A process for the treatment of heavy hydrocarbon oil with hydrogen in the presence of catalyst, said process comprising:

passing the heavy hydrocarbon oil, a hydrogen containing gas and a finely divided particulate catalyst upwardly into the bottom of a lower reaction zone at a temperature of up to about 650° F. and at a feed rate to establish a space velocity sufficient to maintain lower reaction zone in a substantially backmixed condition;

treating said hydrocarbon oil in the lower reaction zone at a pressure of from 500 to 4000 p.s.i.g. and at temperature of from 700° F. to 800° F.;

passing said oil, gas, and catalyst from said lower reaction zone upwardly and directly into an upper reaction zone at a space velocity sufficient to prevent any backmixing between said lower and upper reaction zones and maintaining a space velocity in the upper zone sufficient to result in a substantially backmixed condition;

treating said oil in said upper reaction zone at a pressure of from 500 to 4000 p.s.i.g. and a temperature of from 800° F. to 900° F.; and removing an effluent stream containing the treated hydrocarbon oil and the spent finely divided particulate catalyst from said upper reaction zone.

2. The process of claim 1 wherein said space velocities in said upper and lower reaction zones are from 0.1 to about 5 volumes of oil per hour per volume of reaction zone, and wherein said reaction zones have a height to width ratio of from 1/2:1 to 20:1.

3. The process of claim 1 wherein said space velocities in said upper and lower reaction zones are between about 1.0 and 2.0 volumes of oil per hour per volume of reaction zone and said reaction zones each have a height to width ratio of from 3:1 to 10:1.

4. The process of claim 3 wherein said lower reaction zone temperature is from 700° F. to 780° F. and said upper reaction zone temperature is from 805° F. to 825° F., both reaction zones being maintained at a pressure of between about 1,000 and about 1,500 p.s.i.g.

5. The process of claim 4 wherein said heavy hydrocarbon oil comprises at least 40% of volume material boiling above 650° F., and wherein said particulate catalyst is no larger in size than 300 microns and in the amount of from 0.01 lb. to 0.02 lb. per barrel of hydrocarbon oil.

References Cited

UNITED STATES PATENTS 2,909,476    8/1959    Hemminger _____ 208—59

DELBERT E. GANTZ, Primary Examiner

R. M. BRUSKIN, Assistant Examiner

U.S. Cl. X.R.

208—108